(12) United States Patent
Fenney

(10) Patent No.: US 9,836,395 B2
(45) Date of Patent: Dec. 5, 2017

(54) CACHE HASHING

(71) Applicant: Imagination Technologies Limited, Kings Langley (GB)

(72) Inventor: Simon Fenney, St Albans (GB)

(73) Assignee: Imagination Technologies Limited, Kings Langley (GB)

(*) Notice: Subject to any disclaimer, the term of this patent is extended or adjusted under 35 U.S.C. 154(b) by 8 days.

(21) Appl. No.: 14/858,882

(22) Filed: Sep. 18, 2015

(65) Prior Publication Data

US 2016/0085672 A1    Mar. 24, 2016

(30) Foreign Application Priority Data

Sep. 19, 2014 (GB) .................................. 1416619.3

(51) Int. Cl.
| | | |
|---|---|---|
| G06F 12/00 | (2006.01) |
| G06F 12/0802 | (2016.01) |
| G06F 12/1045 | (2016.01) |
| G06F 12/0846 | (2016.01) |
| G06F 12/0864 | (2016.01) |
| G06F 12/14 | (2006.01) |

(52) U.S. Cl.
CPC ...... *G06F 12/0802* (2013.01); *G06F 12/0846* (2013.01); *G06F 12/0864* (2013.01); *G06F 12/1054* (2013.01); *G06F 12/1408* (2013.01); *G06F 2212/1056* (2013.01); *G06F 2212/608* (2013.01)

(58) Field of Classification Search
None
See application file for complete search history.

(56) References Cited

U.S. PATENT DOCUMENTS

| 7,606,994 B1 | 10/2009 | Cypher |
| 2009/0132784 A1 | 5/2009 | Lee et al. |
| 2012/0198121 A1 | 8/2012 | Bell et al. |
| 2014/0082284 A1 | 3/2014 | Ferrer et al. |

OTHER PUBLICATIONS

Hill et al., "Evaluating Associativity in CPU Caches," IEEE Transactions on Computers, vol. 38, No. 12, Dec. 1989, pp. 1612-1630.
Smith, "Cache Memories," Computing Surveys, vol. 14, No. 3, Sep. 1982, pp. 473-530.

(Continued)

*Primary Examiner* — John A Lane
(74) *Attorney, Agent, or Firm* — Vorys, Sater, Seymour and Pease LLP; Vincent M DeLuca

(57) ABSTRACT

Cache logic generates a cache address from an input memory address that includes a first binary string and a second binary string. The cache logic includes a hashing engine configured to generate a third binary string from the first binary string and to form each bit of the third binary string by combining a respective subset of bits of the first binary string by a first bitwise operation, wherein the subsets of bits of the first binary string are defined at the hashing engine such that each subset is unique and comprises approximately half of the bits of the first binary string; and a combination unit arranged to combine the third binary string with the second binary string by a reversible operation so as to form a binary output string for use as at least part of a cache address in a cache memory.

20 Claims, 4 Drawing Sheets

(56) References Cited

OTHER PUBLICATIONS

Schlansker et al., "Randomization and Associativity in the Design of Placement-Insensitive Caches," Hewlett Packard Company Computer Systems Laboratory, HPL-93-41, Jun. 1993.
Seznec, "A Case for Two-way Skewed-associative Caches," Proceedings of the 20th International Symposium on Computer Architecture, San Diego, May 1993.
Vandierendonck et al., "Trade-offs for Skewed-Associative Caches," (2004) Parallel Computing: Software Technology, Algorithms, Architectures and Applications. p. 467-474.

CACHE HASHING

BACKGROUND OF THE INVENTION

This invention relates to cache logic for generating a cache address, to a cache memory system and to a method for generating a cache address.

Cache memories are widely used to increase the performance of data processing systems by reducing the latency associated with memory accesses. This is generally achieved by caching some previously accessed (e.g. the most recently accessed) data at a cache memory which can be accessed at a lower latency than the main memory in which the data is stored. In order to ensure that cached data can be readily retrieved from the cache memory, the cached data must be organised according to a defined scheme.

Typically the data for caching is held at a resource identified by an address, such as a memory address, or a hardware resource address in a computing system. The access of such resource addresses can follow certain fixed patterns (such as accesses of sequential memory blocks), and care may therefore be taken to ensure that data representing related (e.g. sequential) resource addresses are well-distributed over the cache memory so as to avoid pathological access cases. A sequence of addresses that all map to only a few cache lines is an example of a pathological access case, in which repeatedly accessing the same few cache lines may lead to a significant number of cache line replacements and a poor hit rate when data is required from the cache. Such behaviour severely affects the performance of a cache memory.

Several mechanisms have been proposed in the art for improving the distribution of data over a cache and maximising the cache hit rate for a given size of cache. These mechanisms may use hash functions to inject pseudorandom variation into the mapping of data onto cache addresses. For example, M. Schlansker et al. describe the use of a hash function to randomise the placement of data in a cache in their paper "Randomization and Associativity in the Design of Placement-Insensitive Caches", Computer Systems Laboratory, HPL-93-41, June 1993. However, the use of such complex hash functions is generally too expensive in terms of silicon area and latency to be implemented in the critical path of a high speed cache memory system.

Other mechanisms for improving cache performance by avoiding cache access collisions (e.g. which may occur when cached data cannot be accessed because another cache read is being performed on the same cache line) include using a skewed-associative cache architecture. Such architectures are described in "A case for two-way skewed-associative caches", A. Seznec, Proceedings of the 20$^{th}$ International Symposium on Computer Architecture, San Diego, May 1993 and in "Trade-offs for Skewed-Associative Caches", H. Vandierendonck and K. De Bosschere (a paper published by Dept. of Electronics and Information Systems, Ghent University). Skewed-associative architectures require multiple cache banks because the mechanism achieves low miss rates through inter-bank dispersion of cache addresses. However, as is observed in the Vandierendonck paper, the best performance is achieved by combining a skewed-associative architecture with hash functions to inject random character into the mapping of data into the cache. Again, such hash functions are complex and generally too expensive to implement in the critical path of a high speed cache memory system.

SUMMARY OF THE INVENTION

According to a first aspect of the present invention there is provided cache logic for generating a cache address from a binary input memory address which comprises a first binary string which is a first sequence of bits of a first predefined length and a second binary string which is a second sequence of bits of a second predefined length, the cache logic comprising:

a hashing engine configured to generate a third binary string from the first binary string, the third binary string having the second predefined length, and the hashing engine being configured to form each bit of the third binary string by combining a respective subset of bits of the first binary string by means of a first bitwise operation, wherein the subsets of bits of the first binary string are defined at the hashing engine such that each subset is unique and on average comprises approximately half of the bits of the first binary string; and a combination unit arranged to combine the third binary string with the second binary string by means of a reversible operation so as to form a binary output string for use as at least part of a cache address in a cache memory.

The subsets of bits of the first binary string may be defined in hardware at the hashing engine by means of data paths between bits of the first and third binary strings, each data path being arranged to provide a bit of the first binary string for combination with other bits of the first binary string of the same subset so as to form the corresponding bit of the third binary string.

Said data paths may be physical connections of the hashing engine.

The hashing engine may comprise a plurality of sets of bitwise operators each arranged to form a bit of the third binary string from the corresponding subset of bits of the first binary string.

The binary output string may be for identifying a cache row in a cache memory bank.

The first binary string may be a predetermined sequence of the most significant bits of the binary input memory address.

The second binary string may be a predetermined sequence of less significant bits of the binary input address.

The binary input memory address may have a fixed length and the first and second binary strings are adjacent sequences of bits in the binary input memory address.

The cache logic may further comprise a bank selection unit configured to combine one or more bits derived from the binary output string with an equal number of bits of the binary input memory address by means of a second bitwise operation so as to generate a bank identifier for identifying a bank in a cache memory having a plurality of cache banks.

The bank identifier may be equal in length to the number of bits derived from the binary output string.

The one or more bits of the binary input string may be less significant bits than the bits of the second binary string.

The one or more bits of the binary input string may be adjacent to the second binary string in the binary input string.

The cache logic may further comprise a bank scramble unit having a bit register configured to store a predetermined binary string, the bank scramble unit being configured to operate on the one or more bits of the binary output string by using a sequence of one or more bits from the binary output string as a lookup in the bit register so as to select a predetermined number of bits from the stored predetermined binary string for use as the one or more bits derived from the binary output string in the bank selection unit, wherein the predetermined binary string has the property that the value of the selected bits has substantially the same likelihood of being any of the possible values.

The predetermined binary string may be a pseudorandom binary string.

The predetermined binary string may be $2^N$ bits long and the predetermined sequence of bits from the binary output string may be the N least significant bits of the binary output string, the bank scramble unit being configured to use the N least significant bits of the binary output string as a bit address in the predetermined binary string from which to read the predetermined number of bits from the stored predetermined binary string.

The bit register may be programmable and the bank scramble unit is operable to enable a pseudo-randomly generated binary string to be written into the bit register for use as the predetermined binary string.

The first bitwise operation and the reversible operation may both be XOR operations.

The second bitwise operation may be an XOR operation.

According to a second aspect of the present invention there is provided cache memory system comprising:

cache logic according to the first aspect of the present invention having any of the features describe above; and cache memory having a plurality of cache banks;

wherein the cache memory system is configured to store at the cache row indicated by the binary output string of the cache bank indicated by the bank identifier at least the first binary string and data for caching having the binary input memory address.

Each cache bank may have $2^S$ rows, where S is the number of bits in each of the second and third binary strings.

The binary input memory address may comprise a fourth binary string of the W least significant bits of the binary input memory address, the fourth binary string not comprising the first binary string, the second binary string, or the bits derived from the binary output string for use at the bank selection unit, and each cache row of the cache memory having a width of at least $2^W$ bytes plus the length of the first binary string wide.

According to a third aspect of the present invention there is provided a method for generating a cache address from a binary input memory address which comprises a first binary string which is a first sequence of bits of a first predefined length and a second binary string which is a second sequence of bits of a second predefined length, the method comprising:

receiving the first binary string of the input memory address;

generating a third binary string from the first binary string, the third binary string having the second predefined length, each bit of the third binary string being formed by combining a respective subset of bits of the first binary string by means of a first bitwise operation, wherein the subsets of bits of the first binary string are defined such that each subset is unique and on average comprises approximately half of the bits of the first binary string; and combining the third binary string with the second binary string by means of a reversible operation so as to form a binary output string for use as at least part of a cache address in a cache memory.

Machine readable code may be provided for generating the cache logic. A machine readable storage medium having encoded thereon non-transitory machine readable code may be provided for generating the cache logic.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Cache logic for a high speed cache memory system is described herein that provides the benefits of conventional hashing functions without introducing significant complexity and latency. The cache logic for a cache system may handle any kind of data, including, for example, resource addresses (such as memory and hardware addresses), processor instructions, and data from a memory.

Figure 1:
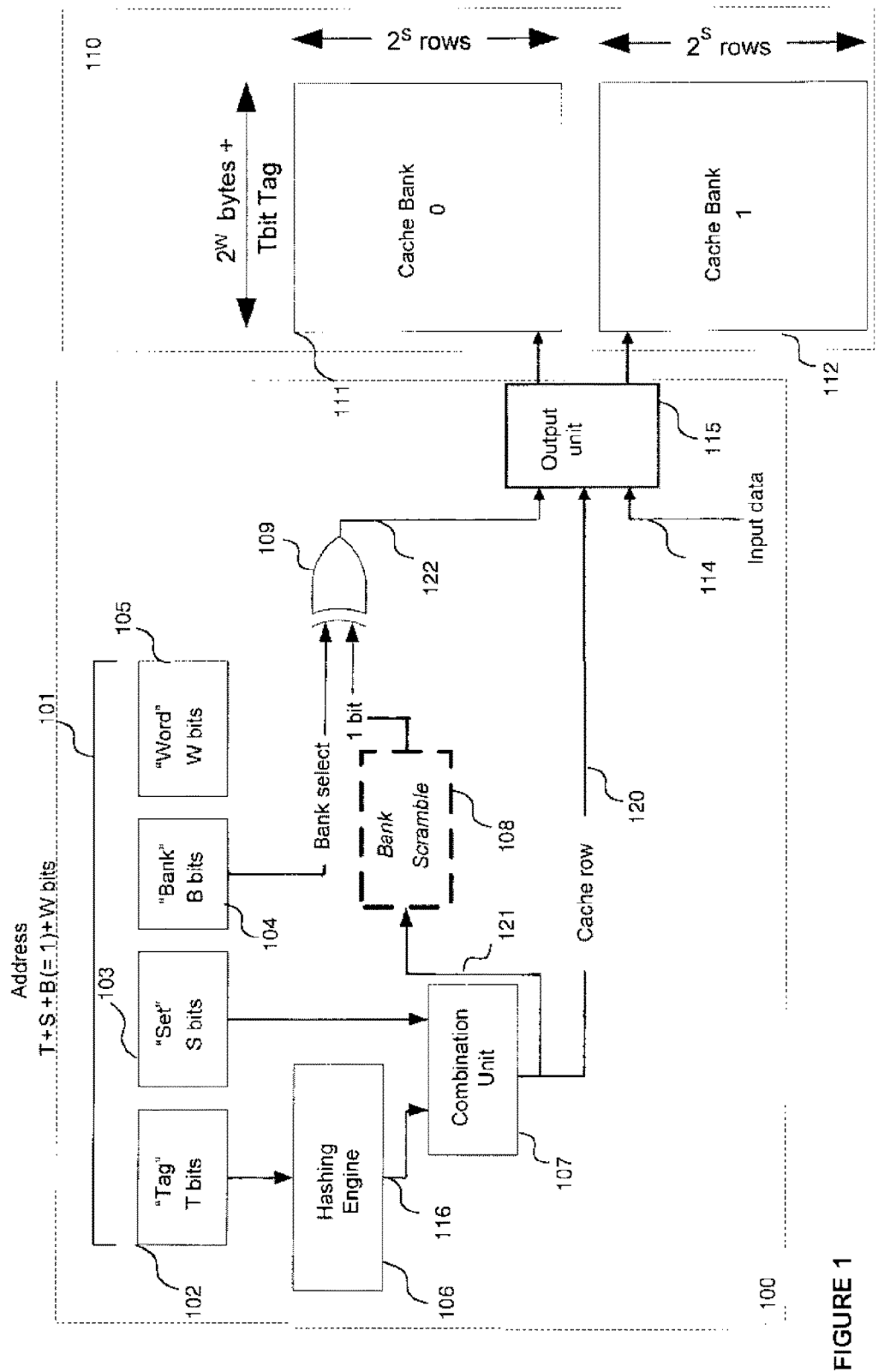
FIG. 1 is a schematic diagram of a cache memory system.

A schematic diagram of a cache memory system is shown in FIG. 1. Cache logic 100 is arranged to determine a cache address for cache memory 110 (typically not part of the cache logic) at which input data 114, having a binary input memory address 101, is to be cached or from which cached data is to be read. In accordance with the invention described herein, only part of input memory address 101 need be stored at the cache memory since parts of the input memory address can be inferred from the location of the data in the cache memory. Cache memory 110 could have any suitable memory architecture: for example, it could be a direct mapped cache memory or an N-way associative cache memory. An example of a method performed by the cache logic is illustrated in the flowchart of FIG. 3 and will be referred to herein.

Cache logic 100 comprises a hashing engine 106 and combination unit 107 arranged to determine a cache row address from the input address 101. In the example shown in FIG. 1, the cache memory 110 comprises two cache banks (111 and 112) and a bank selection unit 109 is provided in the cache logic 100 to select a cache bank. A bank scramble unit 108 can optionally be provided to further improve the performance of the cache logic. The operation of the cache logic will now be described with reference to FIG. 1.

Figure 3:
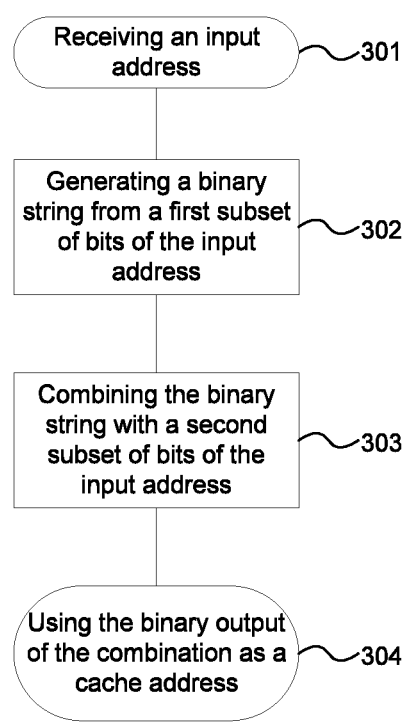
FIG. 3 is a flowchart illustrating a method of generating a cache address.

Cache logic 100 is configured to determine a cache address from the input memory address 101 it receives (step 301 in FIG. 3). The memory address 101 would typically be of fixed length. More generally the input memory address 101 could be any kind of binary string. In the example shown the input memory address 101 is a resource address expressed as a binary string.

In the example shown in FIG. 1, the memory address 101 comprises four sequences of bits: (i) T tag bits 102, (ii) S set bits 103, (iii) B bank bits 104, and (iv) W word bits 105. Therefore the memory address 101 has a length of T+S+B+W bits. Tag bits T are the most significant bits and word bits W are the least significant bits of the memory address 101.

Usually, the cache memory 110 is smaller than the main memory to which the memory address 101 relates, and data in a particular cache line may correspond with data stored at one of a plurality of different memory addresses in the main memory. In a typical cache system, the set and bank bits of the memory address 101 for a line of data are those bits that can be inferred from the location in the cache memory 110 at which the data is stored (or is going to be stored). The tag bits of the memory address 101 are those bits that cannot be inferred from the location in the cache memory 110. The tag bits distinguish between the memory addresses which correspond to the same cache line. Therefore, the tag bits are stored in the cache memory 110, but the set and bank bits do not need to be, and are not, stored in the cache memory 110 when data is stored in the cache memory 110. The word bits indicate a location of data in the main memory to a greater resolution than a cache line, and since data is stored in the cache memory 110 in units of cache lines, the word bits are not needed to be stored in the cache memory 110.

In the example shown in FIG. 1 there are two cache banks 111 and 112 such that one bank bit is sufficient for identifying one of the cache banks, so B=1 in this example. However, in other examples there may be a different number of banks in the cache memory, and usually the number of banks in the cache memory would be a power of two, such as two, four, eight, etc. In these other examples, B might not be equal to one, and instead there would be a number of bank bits (B) which is sufficient for identifying a bank in the cache memory in accordance with the number of banks in the cache memory. The cache rows of the cache memory 110 in the example are $2^W$ bytes+T bits wide such that the tag bits 102 are stored with the data in the cache lines, but in other examples the tag bits 102 are not necessarily stored adjacent to the data bits in the cache lines because it may be useful to allow faster access to the tag bits (e.g. to determine whether the cache currently stores a particular data item, i.e. to determine whether there is a cache hit or a cache miss) and as such the tag bits 102 may be stored in silicon in the cache memory 110 which allows faster access than the silicon on which the data itself is stored in the cache memory 110. More generally, the cache memory 110 may be an N-way set associative cache, in which case each cache line may be $2^W \times N$ bytes+TN bits wide, as appropriate.

Hashing engine 106 is configured to operate on the tag bits 102 from the binary input memory address 101 in order to generate a binary string 116 (step 302 in FIG. 3) which is equal in length to the shorter sequence of S bits 103 from the binary input memory address 101. Therefore, T>S. By arranging that the output of the hashing engine 106 is equal in length to the sequence of S bits 103, combination unit 107 can be configured to combine the hashing engine output and S-bit sequence by means of a simple bitwise operation.

The sequence of T bits is preferably the T most significant bits of the input binary memory address 101 and the sequence of S bits is preferably a sequence of less significant bits. In the example shown in FIG. 1, the "set" bit sequence 103 is adjacent to the "tag" bit sequence 102 in the input binary memory address 101. The tag bits are typically stored with the input data at the cache memory.

The hashing engine 106 essentially applies a hashing function to the binary string 102 in order to better distribute the cache addresses over the rows of the cache memory and to achieve the reduction in string length from T to S bits. The purpose of using the hashing engine 106 is to reduce the likelihood of regular patterns of addresses causing an uneven usage of cache lines. This is achieved in examples described herein by arranging that each output bit of binary string 116 is formed from a predetermined, and unique, subset of input "tag" bits 102. In other words, hashing engine 106 is configured (e.g. hardwired) such that each input "tag" bit is provided to an arrangement of bitwise operators of the hashing engine which are together configured to form the output bits of binary string 116. The bitwise operators are preferably bitwise XORs because XOR operations are very simple to implement in hardware.

The hashing engine 106 is arranged such that each output bit of binary string 116 receives a contribution from approximately half of the bits of the first binary string 102 (e.g. approximately half of the bits of the first binary string 102 are provided to each bitwise operator). This ensures that the hashing engine 106 roughly displays the characteristic of good cryptographic hashing functions that if one input bit changes then, on average, we would expect around half of the output bits 116 to change. Furthermore, if a different one of the input bits changes then, on average, we would expect different bits of the output bits 116 to change but we would still expect around half of the output bits 116 to change. In examples described herein, we achieve the characteristic through predetermined bitwise combinations of input bits and without the complex processing and latency typically introduced by such cryptographic hashing functions. The general aim is that for any change to the input bits 102 (irrespective of how many of the input bits 102 change), on average, approximately half of the output bits 116 will change, and that for different changes to the input bits 102, different ones of the output bits 116 will change. This general aim might not be perfectly achievable, but the examples described herein achieve a good solution with this aim in mind.

For given lengths of the "tag" and "set" bit sequences, there are generally many possible combinations of bits of a first binary string 102 that satisfy the above requirements and provide the advantages of the examples described herein. Two examples illustrating a method by which the sets of connections between the input and output bits of the hashing engine can be determined will now be described.

In the design process, for each bit of the input bits 102, a respective set of bits of the output bits 116 is identified to indicate which bits of the output bits 116 will change when the corresponding input bit changes. If possible, each of the sets of the output bits includes approximately half of the output bits because in this way, when the corresponding input bit changes approximately half of the output bits will change. Furthermore, if possible, the sets of output bits are preferably different to each other, such that changing each of the input bits has a different effect on the output bits. So, if there are T input bits, then T sets of the S output bits are determined. Since it is preferable that each set of output bits includes half of the output bits then initially S Choose S/2 (i.e. $C_{S/2}^S$) different sets can be determined. If this does not provide enough sets then other additional combinations of the output bits are used, as described in more detail below. The method below describes how the sets of output bits are determined for the respective input bits.

In a first example, consider the situation in which the length T of tag bits 102 is 28 bits and the length S of set bits 103 is 5 bits (which is therefore the desired length of the output of the hashing engine 106). First, the number of mathematical combinations of length [S/2] from a set of length S is computed—i.e. in this case, that's 5 Choose 2 since [5/2]=[2.5]=2. This provides 10 sets of output bits, so another 18 sets are still needed to get up to 28 sets of output bits. The next best sets for achieving the aim of changing half of the output bits when one of the input bits changes in this case will be given by 5 Choose 3. This also provides 10 sets of output bits which means we are still 8 short of having 28 (i.e. T) combinations. So we add the next sets given by 5 Choose 1. This provides 5 sets of output bits which means another 3 sets are still needed to get up to 28 sets of output bits. So we add some of the next sets given by 5 Choose 4. This provides 5 sets of output bits from which three can be selected to thereby provide the 28 sets of output bits.

The three selected sets can be selected by taking a sparse sample of the possible sets resulting from the 5 Choose 4 operation. For example, we may keep the first, second and fourth of the five 4-bit sets. The general principles for determining the sets of output bits in other examples are described in more detail below. Once T suitable sets of output bits have been determined, they can each be associated with a respective one of the T input bits. The list below is an example which indicates a respective set of bits from the five output bits ("OUT") which is associated with each of the respective 28 input bits ("IN"). In different examples, the T sets of output bits can be associated with different ones of the input bits. For example, the ordering of the T input bits in the list below could be scrambled (e.g. randomised) to remove systematic biasing in the way in which the sets of output bits are associated with the input bits.

IN: OUT
0: 3 4
1: 2 4
2: 1 4
3: 0 4
4: 2 3
5: 1 3
6: 0 3
7: 1 2
8: 0 2
9: 0 1
10: 2 3 4
11: 1 3 4
12: 0 3 4
13: 1 24
14: 0 2 4
15: 0 1 4
16: 1 2 3
17: 0 2 3
18: 0 1 3
19: 0 1 2
20: 4
21: 3
22: 2
23: 1
24: 0
25: 0 1 23
26: 0 1 3 4
27: 0 2 3 4

This method allows us to readily determine a suitable set of input to output connections for the hashing engine. The list above can be used to identify which output bits receive a contribution from which input bits. That is, for each output bit, a set of input bits can be identified for use in determining the output bit. Each set of input bits is combined in the hashing engine 106 by means of a bitwise operation, e.g. in this example an XOR operation. The five output bits of binary string 116 are therefore:

Out[0]=In[3] XOR In[6] XOR In[8] XOR In[9] XOR In[12] XOR In[14] XOR In[15] XOR In[17] XOR In[18] XOR In[19] XOR In[24] XOR In[25] XOR In[26] XOR In[27];

Out[1]=In[2] XOR In[5] XOR In[7] XOR In[9] XOR In[11] XOR In[13] XOR In[15] XOR In[16] XOR In[18] XOR In[19] XOR In[23] XOR In[25] XOR In[26] XOR In[27];

Out[2]=In[1] XOR In[4] XOR In[7] XOR In[8] XOR In[10] XOR In[13] XOR In[14] XOR In[16] XOR In[17] XOR In[19] XOR In[22] XOR In[25] XOR In[26] XOR In[27];

Out[3]=In[0] XOR In[4] XOR In[5] XOR In[6] XOR In[10] XOR In[11] XOR In[12] XOR In[16] XOR In[17] XOR In[18] XOR In[21] XOR In[25] XOR In[26] XOR In[27];

Out[4]=In[0] XOR In[1] XOR In[2] XOR In[3] XOR In[10] XOR In[11] XOR In[12] XOR In[13] XOR In[14] XOR In[15] XOR In[20] XOR In[25] XOR In[26] XOR In[27].

Where in the above list of outputs, as an example, "In[11]" refers to the input bit at position 11 in tag 102, and "Out[3]" refers to the output bit at position 3 in output 116, and so on.

In a second example, consider the situation in which the length T of tag bits 102 is 31 bits and the length S of set bits 103 is 7 bits (which is now the desired length of the output of the hashing engine 106). First, in order to determine the sets of output bits which will be associated with the respective input bits, the number of mathematical combinations of length [S/2] from a set of length S is computed—i.e. in this case, that's 7 Choose 3 which gives 35 combinations. Since we have too many combinations, we take a sparse sample of the list of possible sets of output bits—for example, let's say we throw away the sets at positions 4 (which would include output bits 056), 13 (which would include output bits 026), 22 (which would include output bits 125) and 31 (which would include output bits 123) in a list of the possible combinations of three output bits. Similarly to in the first example described above, once T suitable sets of output bits have been determined, they can each be associated with a respective one of the T input bits. The list below is an example which indicates a respective set of bits from the seven output bits ("OUT") which is associated with each of the respective 31 input bits ("IN"). As mentioned above, in different examples, the T sets of output bits can be associated with different ones of the input bits.

IN: OUT
0: 4 5 6
1: 3 5 6
2: 2 5 6
3: 1 5 6
4: 3 4 6
5: 2 4 6
6: 1 4 6
7: 0 4 6
8: 2 3 6
9: 1 3 6
10: 0 3 6
11: 1 2 6
12: 0 1 6
13: 3 4 5
14: 2 4 5
15: 1 4 5
16: 0 4 5
17: 2 3 5
18: 1 3 5
19: 0 3 5
20: 0 2 5
21: 0 1 5
22: 2 3 4

23: 1 3 4
24: 0 3 4
25: 1 2 4
26: 0 2 4
27: 0 1 4
28: 0 2 3
29: 0 1 3
30: 0 1 2

The list above can be used to identify which output bits receive a contribution from which input bits. That is, for each output bit, a set of input bits can be identified for use in determining the output bit. Expressed as a set of input bits combined in the hashing engine by means of a XOR operation, the seven output bits of binary string 116 are therefore:

Out[0]=In[7] XOR In[10] XOR In[12] XOR In[16] XOR In[19] XOR In[20] XOR In[21] XOR In[24] XOR In[26] XOR In[27] XOR In[28] XOR In[29] XOR In[30];

Out[1]=In[3] XOR In[6] XOR In[9] XOR In[11] XOR In[12] XOR In[15] XOR In[18] XOR In[21] XOR In[23] XOR In[25] XOR In[27] XOR In[29] XOR In[30];

Out[2]=In[2] XOR In[5] XOR In[8] XOR In[11] XOR In[14] XOR In[17] XOR In[20] XOR In[22] XOR In[25] XOR In[26] XOR In[28] XOR In[30];

Out[3]=In[1] XOR In[4] XOR In[8] XOR In[9] XOR In[10] XOR In[13] XOR In[17] XOR In[18] XOR In[19] XOR In[22] XOR In[23] XOR In[24] XOR In[28] XOR In[29];

Out[4]=In[0] XOR In[4] XOR In[5] XOR In[6] XOR In[7] XOR In[13] XOR In[14] XOR In[15] XOR In[16] XOR In[22] XOR In[23] XOR In[24] XOR In[25] XOR In[26] XOR In[27];

Out[5]=In[0] XOR In[1] XOR In[2] XOR In[3] XOR In[13] XOR In[14] XOR In[15] XOR In[16] XOR In[17] XOR In[18] XOR In[19] XOR In[20] XOR In[21];

Out[6]=In[0] XOR In[1] XOR In[2] XOR In[3] XOR In[4] XOR In[5] XOR In[6] XOR In[7] XOR In[8] XOR In[9] XOR In[10] XOR In[11] XOR In[12].

Many variations on the above sets are possible, but the above method provides a straightforward technique for determining a set of input to output mappings for the hashing engine 106 which ensure that each output bit of binary string 116 receives a contribution from approximately half of the bits of the first binary string 102. In the first example above, each of the 5 bits of binary output string 116 receives a contribution from either 14 or 15 of the 28 input bits of tag 102; and in the second example above, each of the 7 bits of binary output string 116 receives a contribution from between 12 and 15 of the 31 input bits of tag 102. In a first embodiment, each set of input bits which is combined to form an output bit comprises, on average over the sets, between 40% and 60% of the input bits. In a second embodiment, each set of input bits which is combined to form an output bit comprises, on average over the sets, between 42% and 58% of the input bits. In a third embodiment, each set of input bits which is combined to form an output bit comprises, on average over the sets, between 45% and 55% of the input bits.

The above method can be generalised as follows. Given T input bits and S output bits, compute S Choose [S/2] to see how many mathematical combinations this yields corresponding to different sets including [S/2] of the output bits. If the number of combinations is greater than T, then sparse sample the list of the combinations to determine T sets of output bits. If the number of combinations is less than T, then we need to determine some more sets of output bits which have a different number of the output bits in them.

The aim is to have sets which include close to S/2 of the output bits in them, but there is the, sometimes conflicting, aim of determining unique sets of output bits if possible. So if [S/2] does not provide at least T sets of output bits, then we can try additional sets of output bits with different numbers of output bits in them. The next unused number which is closest to S/2 will be used for the number of output bits in the sets. When there is a pair of numbers which are equally close to S/2 which are both as yet unused then the lower of the two numbers will be used first because this results in fewer XOR operations needing to be performed, and therefore slightly less hardware is needed. For example, if S is even (e.g. S=6) then [S/2]=S/2 (e.g. [S/2]=3), and if S Choose S/2 (e.g. 6 Choose 3) does not provide enough combinations, then S Choose S/2-1 (e.g. 6 Choose 2) is used. If this still does not provide enough combinations then S Choose S/2+1 (e.g. 6 Choose 4) is used, and so on in the order S Choose S/2-2, S Choose S/2+2, S Choose S/2-3, etc. until T or more combinations have been determined.

If more than T combinations have been determined then the final combinations to be determined (e.g. S/2-3) are sparse sampled (note that the earlier combinations are not sparse sampled in this example) in order to determine the T combinations. In this way the T input bits can be assigned a set of output bits to which they will contribute. If S is odd (e.g. S=7) then [S/2]≠S/2 (e.g. [S/2]=3), and if S Choose [S/2] (e.g. 7 Choose 3) does not provide enough combinations, then S Choose [S/2]+1 (e.g. 7 Choose 4) is used. If this still does not provide enough combinations then S Choose [S/2]−1 (e.g. 7 Choose 2) is used, and so on in the order S Choose [S/2]+2, S Choose [S/2]−2, S Choose [S/2]+3, etc. until ≥T combinations have been determined. If more than T combinations have been determined then the final combinations to be determined (e.g. [S/2]+3) are sparse sampled (note that the earlier combinations are not sparse sampled in this example) in order to determine the T combinations. In this way the T input bits can be assigned a set of output bits to which they will contribute. If there are fewer than T unique sets of output bits which can possibly be formed from the S output bits then at least some of the sets of output bits will need to be re-used for associating with different input bits.

Figure 4:
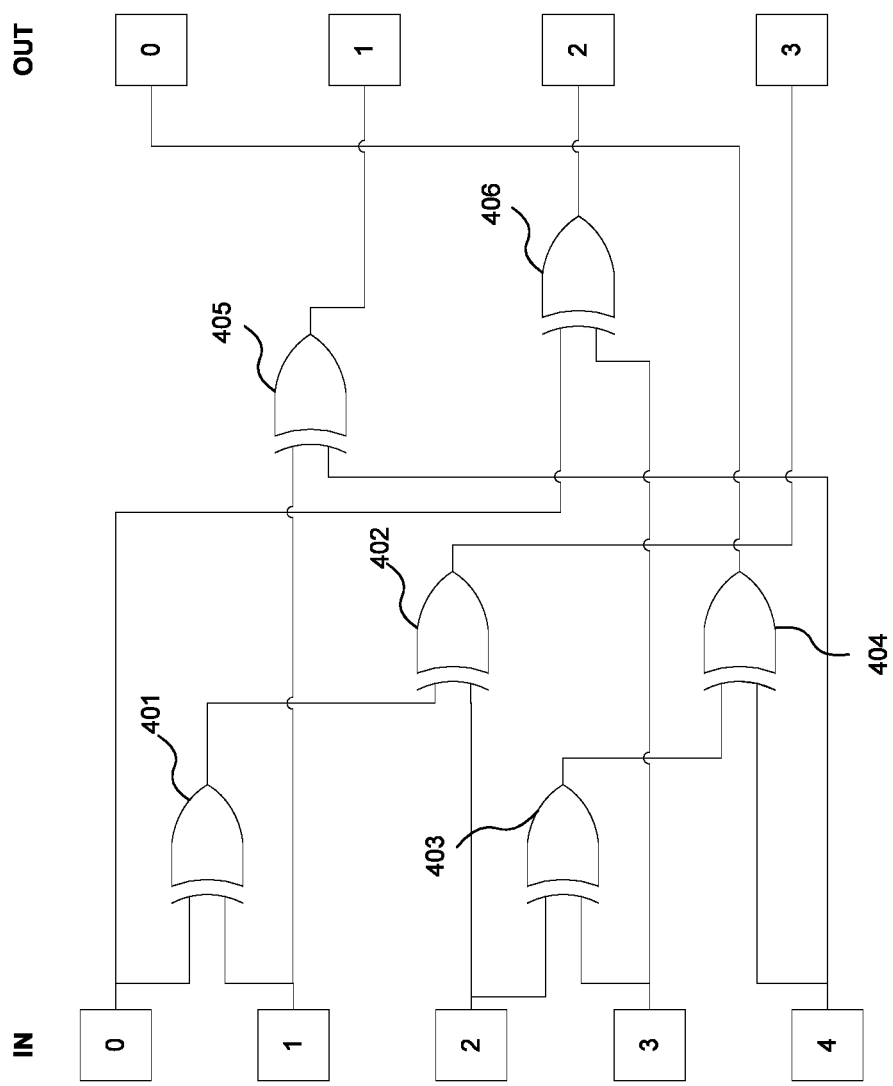
FIG. 4 is a schematic diagram of a hardwired hashing engine according to one example.

The hashing engine 106 can be hardwired such that each input "tag" bit is provided to an arrangement of bitwise XORs together configured to form the output bits of binary string 116. A simple example of such an embodiment is shown in FIG. 4. In the figure, the number of tag bits T is 5 (the input) and the number of set bits S is 4 (the output). The figure illustrates a suitable arrangement of XORs 401-406 according to the principles described above so as to form output bits as follows:

Out[0]=In[2] XOR In[3] XOR In[4] Out[1]=In[1] XOR In[4]

Out[2]=In[0] XOR In[3]

Out[3]=In[0] XOR In[1] XOR In[2]

The binary output string 116 generated by the hashing engine 106 is combined at combination unit 107 with set bit sequence 103 from the input string 101 by means of a reversible operation, preferably a bitwise XOR operation (this is step 303 of FIG. 3), although in other examples this reversible operation could be another reversible operation such as addition or subtraction modulo $2^S$. A XOR operation is straightforward and fast to implement in logic. Furthermore, the XOR operation acts to 'blend' the output string 116 (which is a mix of the tag bits 102 of the input memory address 101) with the set bits 103 of the input memory address 101 which can help to ensure that accesses to sequential memory addresses are not stored at the same cache line. The output 120 of the combination unit 107 is used as a cache line/row identifier in cache memory 110 and therefore indicates at which line tag bits 102 and the data itself are to be stored (this is step 304 of FIG. 3). Preferably each cache bank would have $2^S$ rows such that each S bit output 120 identifies a particular cache line.

A hashing engine configured in accordance with the examples described herein effectively embodies a simple hashing function, which is fast enough to be used in the critical path and does not significantly increase the complexity or power consumption of a cache memory. The hashing engine 106 also ensures that sequences of data having regular patterns of input memory addresses are distributed across the cache memory 110.

Typically, a cache memory system will have more than one cache bank. In FIG. 1 there are two cache banks, 111 and 112. Cache entries can be distributed between these memory banks by a bank selection unit 109. In some embodiments, the bank selection unit 109 is a bitwise operator that receives the least significant bit (121) of cache row 120 and combines that bit with a "bank" bit 104 from input memory address 101 (preferably the bit adjacent to but less significant than set bits 103). The bitwise operator 109, which in the example shown in FIG. 1 is a XOR, provides a bank indicator 122 at its output so as to direct input data 114 to the cache row 120 of one of the two cache banks 111 or 112. In this manner, cache entries are distributed between the cache banks and the advantages of multibank caches can be realised. If there are more than two cache banks, the number of least significant bits from cache address 120 and the (equal) number of bank bits is increased as appropriate (e.g. for four banks, two bank bits would be required).

In preferred embodiments however, the cache logic 100 further comprises a bank scramble unit 108 which is configured to provide an input (e.g. a pseudorandom input) to the bank selection unit 109 in place of bits from the cache row 120. The least significant bit(s) from the cache row 120 are instead used as a lookup into a bit register of the bank scramble unit 108 storing a bit sequence (e.g. a pseudorandom bit sequence) for which the likelihood that a lookup will return any of the possible values is substantially the same for all of the possible values.

Figure 2:
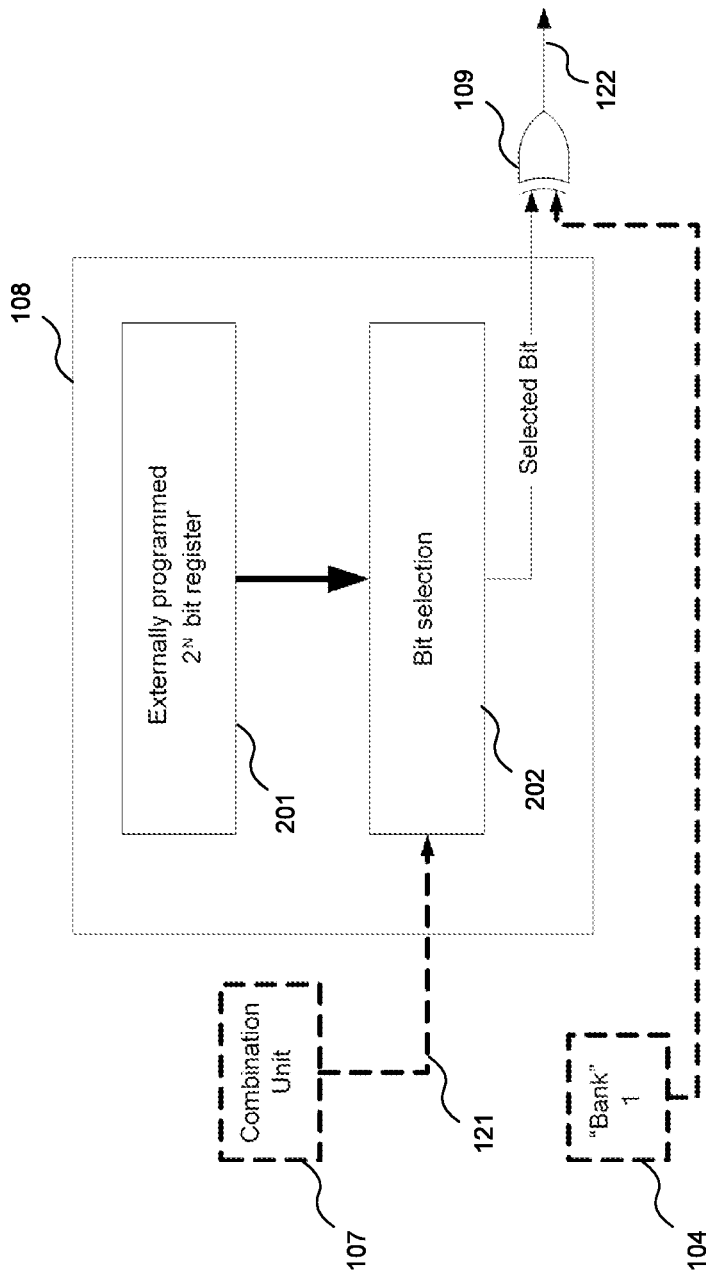
FIG. 2 is a schematic diagram of a bank scramble unit.

Bank scramble unit 108 is shown in more detail in FIG. 2 and comprises a bit register 201 for storing a binary sequence, and a bit selection unit 202 for selecting one or more bits from the binary sequence. The bit register 201 and bit selection unit 202 could be provided by any suitable combination of logic and memory suitable for storing a binary string of the required length; the bit register and selection unit could for example be a single logic unit, or part of a larger logic unit.

The bank scramble unit 108 could store a fixed binary sequence or could generate its own pseudorandom sequence of bits for use as the binary sequence according to any suitable technique known in the art. Preferably however, bit register 201 is programmable by an external agent such as a software or hardware functionality of a host computer at which the cache logic 100 is supported. This avoids increasing the complexity of the cache logic and leverages the processing power typically available at other parts of the data processing system in which the cache logic is implemented in order to form the binary string. Typically the bit register 201 would be initialised by a system driver on system reset or on power-up of the system.

The binary string stored at the bit register 201 may be pseudorandomly generated. However, preferably, an equal number of all of the possible values are inserted into positions of the binary string and then the values are shuffled within the binary string, such that the probability that a lookup from the binary string will return any of the possible values is substantially the same for all of the possible values. However the binary string is generated, it preferably has the property that if a group of B bits (e.g. B=1 in the examples described in detail above) is read from the binary string at any point within the binary string then the likelihood of reading any of the possible $2^B$ is substantially the same. For example, if B=1 then it is preferable that around half of the bits of the binary string are zero so that the bank scramble unit is approximately equally likely to select each bank of the cache memory. This can be achieved by randomly (or pseudorandomly) generating a binary string and then discarding generated binary strings that do not satisfy this condition until a binary string is generated that does satisfy the condition. The condition can be enforced in one example by only storing binary strings at the bit register that have between 40-60% zeros, or in another example by only storing binary strings at the bit register that have between 45 and 55% zeros. Alternatively, for examples in which B>1, a Gray code sequence could be used for the binary string, such that the binary string cycles through all the possible values. The way in which the binary string is formed may depend on the order in which data is accessed.

The bank scramble unit 108 is configured to use one or more least significant bits 121 of the cache row 120 as a lookup into the binary string stored at the bit register 201. This arrangement means that bits of the cache address are not used in the bank selection unit 109 but rather provide a means by which bits are chosen from a (e.g. pseudorandom) binary string by the bank scramble unit 108. Least significant bits 121 are used as a lookup into bit register 201 by selection unit 202 in the manner appropriate to the architecture of the bit register employed in the bank scramble unit. For example, the least significant bits could be used to identify a bit position in the bit register or as a seed for an algorithm arranged to choose one or more bits from the bit register.

In preferred embodiments, the bit register is $2^N$ bits in length, where N is the number of least significant bits 121 of the cache address 120. This allows the least significant bits 121 to be used as an address identifying a bit position in the binary string stored in the register 201. For example, if N=5 then the binary string at the bit register is 32 bits long, with the 5 bit string of the least significant bits 121 of a given cache address identifying a particular bit of the binary string. The number of bits required for the bank selection unit 109 are selected in sequence starting from that particular bit in the bit register 201 (e.g. for a cache memory having two cache banks, just the identified bit is selected; for four cache banks two bits are selected).

The one or more bits selected by selection unit 202 from the bit register 201 are provided to bank selection unit 109 for combination with the one or more bank bits 104 in the manner described above. The bank selection unit 109 (which is preferably a XOR operator) generates bank indicator 122 so as to identify a cache bank at which the data and the tag bits 102 are to be stored.

The use of the bank scramble unit 108 acts to distribute the accesses to the banks by the cache system. Since the binary sequence stored in the register 201 may be selected to have pseudorandom characteristics (whilst preferably ensuring that around 50% of the bits are zeros), the bank scramble unit 108 generally provides better performance than mixing bit(s) of the cache row indicator 121 with bank bit(s) 104. This is because the bank selection made by the bank scramble unit is essentially decoupled from the particular sequence of bits present in the memory address 101 and is therefore less likely to result in pathological access patterns between the cache banks. The bank scramble unit 108 can be effectively disabled by setting all of the bits of the bit register 201 to zeros, or all of the bits to ones.

Note that the use of a XOR as the bank selection unit 109 ensures that, in the case of burst transfers of data, pairs of aligned $2^W$ byte reads will still read from/write to alternate banks and hence provide the associated performance benefits. That is, for two memory adjacent addresses which have the same tag and set bits but different bank bits, the cache row indication 120 output from the combination unit 107 will be the same, but the cache bank indicator output from the bank selection unit 109 will be different. For other read/write patterns (for which the tag and/or set bits changed between two memory addresses, e.g. if the set bits are increased by one), the cache accesses will be well distributed amongst the banks 111 and 112, thus avoiding pathological access cases. It is noted that, the hashing of the tag bits and the bank scrambling are deterministic processes in the sense that a given memory address 101 will map to the same cache address if the cache mapping is repeated.

Typically only part of the input memory address 101 is used as tag and set bits, with the lowest significant bits being unused by the cache logic and represented by word bits 105 in FIG. 1. In order to allow an input memory address to be recreated from the cache memory, not all of its bits need to be stored in the cache. This is because, on reading an entry from the cache:

a) the value of the bank indicator bit(s) 122 and the cache row indicator bits 120 are known since it is known where in the cache the entry was read from. The least significant bits of the cache row indicator can be passed through the bank scramble unit 108 (or an equivalent unit), and the result can be used as an input to an XOR operation, which has the bank indicator bit(s) as another input to thereby find the bank bit(s) of the memory address.

b) the set bits can be readily calculated from the cache row indicator bits 120 because the operation performed at the combination unit 107 is reversible. The tag is stored in the cache and can be, for example, pushed through the hashing engine again (or an equivalent unit) so as to reveal the bits that must have been combined with the set bits to form the cache row address. Since the output of the combination unit is known (the cache row indicator bits) and one of the inputs to the combination unit is known, the other input to the combination unit of the set bits 103 can be determined because the operation performed at the combination unit 107 is reversible.

Thus, the information content of a binary input memory address can be stored at cache memory 110 by storing only the tag bits 102 of the memory address 101 along with the data itself which is of length $2^W$. The word bits are determined by the byte-position in the cache line at which the data was stored.

Cache logic configured in accordance with the present invention could comprise one or more of, for example, dedicated hardware logic, suitably programmed reconfigurable logic (e.g. an FPGA), and/or a processor executing code configured such as to cause, the combination of processor and code to provide the functionalities of the invention described herein (such as an ASIC or FPGA). In preferred embodiments the cache logic is a hardwired logic unit.

The claimed functionalities of the cache logic (e.g. the hashing engine, combination unit, bank selection unit and bank scramble unit) need not be provided as discrete units and represent functionalities that could (a) be combined in any manner, and (b) themselves comprise one or more logic units.

The terms software and program code as used herein includes executable code for processors (e.g. CPUs and/or GPUs), firmware, bytecode, programming language code such as C or OpenCL, and modules for reconfigurable logic devices such as FPGAs. Machine-readable code includes software/program code, as well as code for defining hardware representations of integrated circuits at any level, including at register transfer level (RTL), at high-level circuit representations such as Verilog or VHDL, and lower-level representations such as OASIS and GDSII.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. The software could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. Cache logic for generating a cache address from a binary input memory address that includes a first binary string of a first sequence of bits of a first predefined length and a second binary string of a second sequence of bits of a second predefined length, the cache logic comprising:

a hashing engine configured to generate a third binary string from the first binary string, the third binary string having the second predefined length, and the hashing engine being further configured to form each bit of the third binary string by combining a respective subset of bits of the first binary string by means of a first bitwise operation, wherein the subsets of bits of the first binary string are defined at the hashing engine such that each subset is unique and on average comprises approximately half of the bits of the first binary string; and a combination unit arranged to combine the third binary string with the second binary string by a reversible operation so as to form a binary output string for use as at least part of a cache address in a cache memory.

2. Cache logic as claimed in claim 1, wherein the subsets of bits of the first binary string are defined in hardware at the hashing engine by data paths between bits of the first and third binary strings, each data path being arranged to provide a bit of the first binary string for combination with other bits of the first binary string of the same subset so as to form the corresponding bit of the third binary string.

3. Cache logic as claimed in claim 1, wherein said data paths are physical connections of the hashing engine.

4. Cache logic as claimed in claim 1, wherein the hashing engine further comprises a plurality of sets of bitwise operators each arranged to form a bit of the third binary string from the corresponding subset of bits of the first binary string.

5. Cache logic as claimed in claim 1, wherein the binary output string is for identifying a cache row in a cache memory bank.

6. Cache logic as claimed in claim 1, wherein the first binary string is a predetermined sequence of the most significant bits of the binary input memory address.

7. Cache logic as claimed in claim 6, wherein the second binary string is a predetermined sequence of less significant bits of the binary input address.

8. Cache logic as claimed in claim 1, wherein the binary input memory address has a fixed length and the first and second binary strings are adjacent sequences of bits in the binary input memory address.

9. Cache logic as claimed in claim 1, further comprising a bank selection unit configured to combine one or more bits derived from the binary output string with an equal number of bits of the binary input memory address by a second bitwise operation so as to generate a bank identifier for identifying a bank in a cache memory having a plurality of cache banks.

10. Cache logic as claimed in claim 9, wherein the bank identifier is equal in length to the number of bits derived from the binary output string.

11. Cache logic as claimed in claim 9, wherein the one or more bits of the binary input string are less significant bits than the bits of the second binary string.

12. Cache logic as claimed in claim 11, wherein the one or more bits of the binary input string are adjacent to the second binary string in the binary input string.

13. Cache logic as claimed in claim 9, further comprising a bank scramble unit having a bit register configured to store a predetermined binary string, the bank scramble unit being configured to operate on the one or more bits of the binary output string by using a sequence of one or more bits from the binary output string as a lookup in the bit register so as to select a predetermined number of bits from the stored predetermined binary string for use as the one or more bits derived from the binary output string in the bank selection unit, wherein the value of the selected bits of the predetermined binary string has substantially the same likelihood of being any of the possible values.

14. Cache logic as claimed in claim 13 wherein the predetermined binary string is a pseudorandom binary string.

15. Cache logic as claimed in claim 13, wherein the predetermined binary string is $2^N$ bits long and the predetermined sequence of bits from the binary output string is the N least significant bits of the binary output string, the bank scramble unit being configured to use the N least significant bits of the binary output string as a bit address in the predetermined binary string from which to read the predetermined number of bits from the stored predetermined binary string.

16. Cache logic as claimed in claim 13, wherein the bit register is programmable and the bank scramble unit is operable to enable a pseudo-randomly generated binary string to be written into the bit register for use as the predetermined binary string.

17. A cache memory system comprising:
cache logic for generating a cache address from a binary input memory address that includes a first binary string of a first sequence of bits of a first predefined length and a second binary string of a second sequence of bits of a second predefined length, the cache logic comprising:
a hashing engine configured to generate a third binary string from the first binary string, the third binary string having the second predefined length, and the hashing engine being configured to form each bit of the third binary string by combining a respective subset of bits of the first binary string by a first bitwise operation, wherein the subsets of bits of the first binary string are defined at the hashing engine such that each subset is unique and on average comprises approximately half of the bits of the first binary string; and
a combination unit arranged to combine the third binary string with the second binary string by a reversible operation so as to form a binary output string for use as at least part of a cache address in a cache memory; and
cache memory having a plurality of cache banks;
wherein the cache memory system is configured to store at the cache row indicated by the binary output string of the cache bank indicated by the bank identifier at least the first binary string and data for caching having the binary input memory address.

18. A cache memory system as claimed in claim 17, wherein each cache bank has $2^S$ rows, where S is the number of bits in each of the second and third binary strings.

19. A cache memory system as claimed in claim 17, wherein the binary input memory address comprises a fourth binary string of W least significant bits of the binary input memory address, the fourth binary string not comprising the first binary string, the second binary string, or the bits derived from the binary output string for use at the bank selection unit, and each cache row of the cache memory having a width of at least $2^W$ bytes plus the length of the first binary string wide.

20. A non-transitory computer readable storage medium having stored thereon computer readable instructions that, when processed at a computer system for generating a manifestation of an integrated circuit, cause the computer system to generate a manifestation of cache logic for generating a cache address from a binary input memory address including a first binary string of a first sequence of bits of a first predefined length and a second binary string of a second sequence of bits of a second predefined length, the cache logic comprising:
a hashing engine configured to generate a third binary string from the first binary string, the third binary string having the second predefined length, and the hashing engine being configured to form each bit of the third binary string by combining a respective subset of bits of the first binary string by a first bitwise operation, wherein the subsets of bits of the first binary string are defined at the hashing engine such that each subset is unique and on average comprises approximately half of the bits of the first binary string; and
a combination unit arranged to combine the third binary string with the second binary string by a reversible operation so as to form a binary output string for use as at least part of a cache address in a cache memory.

* * * * *